United States Patent [19]

Schmitz et al.

[11] Patent Number: 4,811,523

[45] Date of Patent: Mar. 14, 1989

[54] APPARATUS FOR FINE MACHINING OF PLANE SURFACES OF DISK-SHAPED WORKPIECES HAVING AN UNMACHINED BEARING SIDE AND A SLIGHT WALL THICKNESS

[75] Inventors: Heinz-Gunter Schmitz, Remscheidl; Johann Konken, Hurth, both of Fed. Rep. of Germany

[73] Assignee: Supfina Maschinenfabrik Hentzen KG, Remscheid, Fed. Rep. of Germany

[21] Appl. No.: 853,838

[22] Filed: Apr. 21, 1986

[30] Foreign Application Priority Data

Apr. 24, 1985 [DE] Fed. Rep. of Germany ....... 3514741

[51] Int. Cl.4 .................................................. B24B 5/00
[52] U.S. Cl. .................................... 51/131.1; 51/131.3; 51/217 T; 51/240 T; 51/277
[58] Field of Search ............... 51/131.1, 131.3, 131.5, 51/240 T, 240 A, 240 GB, 240 R, 217 T, 217 L, 277, 216 LP, 235, 284 R

[56] References Cited

U.S. PATENT DOCUMENTS

| | | | |
|---|---|---|---|
| 2,573,668 | 10/1951 | Long et al. | 51/217 L |
| 4,213,698 | 7/1980 | Firtion et al. | 51/235 |
| 4,357,006 | 11/1982 | Hayes | 51/235 |
| 4,693,035 | 9/1987 | Doyle | 51/277 |

*Primary Examiner*—Frederick R. Schmidt
*Assistant Examiner*—Maurina Rachuba
*Attorney, Agent, or Firm*—Jones, Tullar & Cooper

[57] ABSTRACT

An apparatus for fine machining of plane surfaces of disk-shaped workpieces having an unmachined bearing side and a slight wall thickness is described. The apparatus is provided with a chuck, preferably realted, for receiving the workpiece and a cup wheel. To assure that the pieces are supported over a defined and sufficiently large area to prevent both tilting during the machining and bending due to the machine pressure, so that a surface of highly accurate shape is attainable, the chuck for receiving the workpiece is provided with three fixed support pins distributed over the circumference and against which the workpiece is pressed. Between the three fixed support pins, a plurality of further support elements are provided, which can be supportingly fixed against the bearing side of the workpiece once the workpiece has been placed upon the three fixed support pins.

15 Claims, 1 Drawing Sheet

U.S. Patent  Mar. 14, 1989  4,811,523
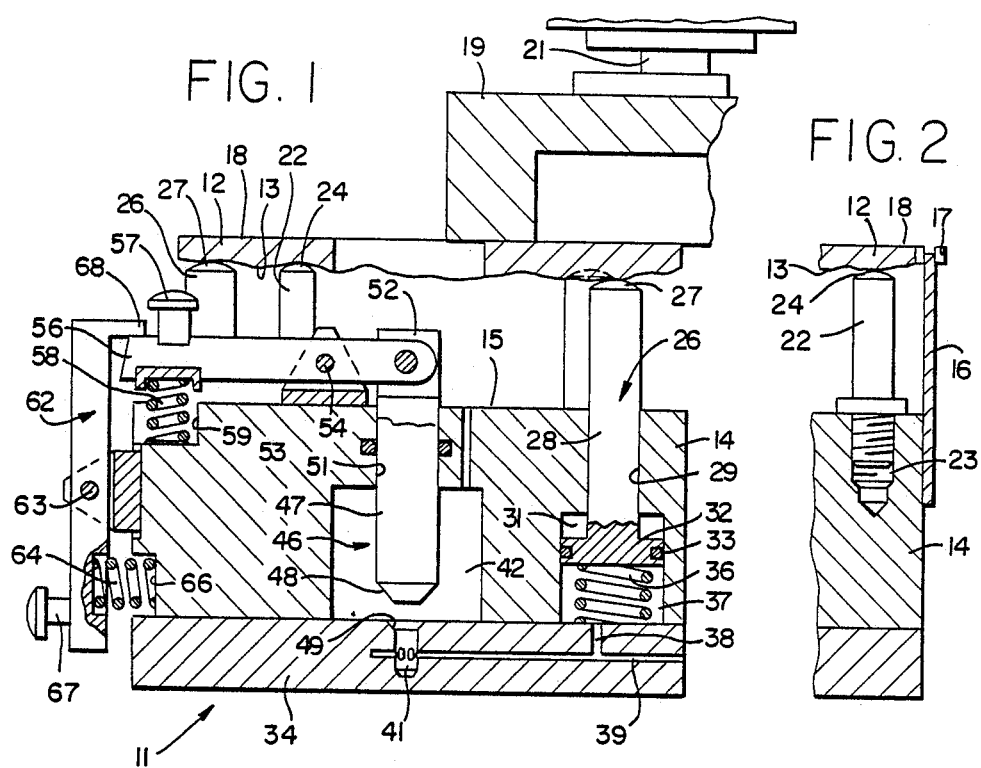
FIG. 1
FIG. 2
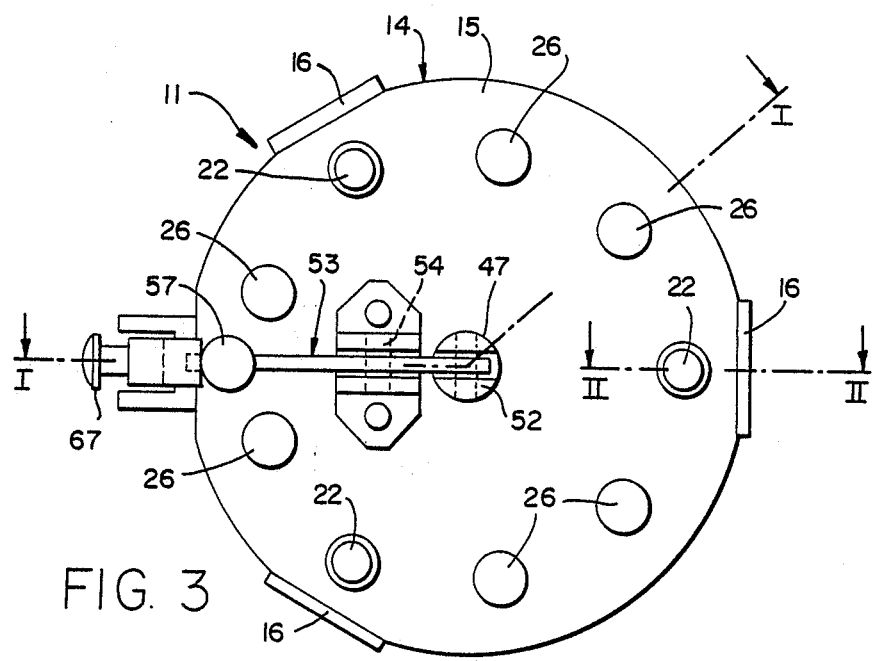
FIG. 3

APPARATUS FOR FINE MACHINING OF PLANE SURFACES OF DISK-SHAPED WORKPIECES HAVING AN UNMACHINED BEARING SIDE AND A SLIGHT WALL THICKNESS

FIELD OF THE INVENTION

The present invention relates to an apparatus for fine machining of plane surfaces of disk-shaped workpieces with an unmachined bearing side and a slight wall thickness; the apparatus has a chuck, preferably driven to rotate, for receiving the workpiece and has a tool, preferably in the form of a cup wheel.

BACKGROUND OF THE INVENTION

Workpieces of this kind are advantageously machined using cup wheels, which cover the rotating workpiece to beyond their middle. By inclining the axis of the grinding spindle relative to the workpiece axis, convex and concave surfaces can be produced as well.

In general, such workpieces are received on a flat workpiece holder. If the workpieces have an unmachined bearing side, this is impossible, however, or is possible only with limitations because tilting during the machining operation is then unavoidable. The result is that the machined surface deviates from the desired form. On the other hand, however, with workpieces having only a slight wall thickness, it is necessary for them to be held over as large an area as possible, to prevent them from bending in response to the pressure applied during machining.

OBJECT AND SUMMARY OF THE INVENTION

It is accordingly an object of the present invention to provide an apparatus for the fine machining of plane surfaces of disk-shaped workpieces that have an unmachined bearing side and a slight wall thickness of the above type, in which the workpieces are supported over a defined and sufficiently large area, so as to avoid both tilting during machining and bending under the machining pressure, and thus to attain a surface of highly accurate shape.

According to the present invention, the workpieces are held in a reliably tilt-free manner by a three-point support. The support pins are generally fixed, because the unmachined bearing side of the workpieces is sufficiently flat to assure that the workpiece that is to be machined will be flat as well, if the three fixed support pins are located in a plane that is parallel to the cup wheel. However, it may on occasion be necessary to make these fixed support pins adjustable in height, so that workpieces can also be received which have a more irregularly shaped bearing side. However, since three support points are inadequate for thin workpieces, because the regions located between the support points could become elastically bent from the grinding pressure, further support elements are also provided, which supportingly fix the workpiece in all these regions. As a result, bending of the workpiece during the machining operation is prevented, and so the removal of material is effected uniformly over the entire surface that is to be machined, and errors in shape are avoided.

In a preferred exemplary embodiment of the present invention, the further support elements, in their initial position, protrude beyond the fixed support pins and are supported in a resiliently yielding manner in the axial direction, so that they can be pushed back into their working position in which they contact the bearing side of the workpiece. In this exemplary embodiment, when the workpiece is placed upon the fixed support pins, the further support elements are pushed back, so that from the beginning they are appropriately in contact with the bearing side of the workpiece. Whenever the workpiece is arranged in its position for machining, a preferred feature of the present invention provides that the further support elements are locked in this position, that is, their working position, so that they can support the corresponding regions of the workpiece without yielding while the workpiece is being machined.

In this preferred embodiment, the further support elements are provided with a hydraulic piston, supported in a cylinder under the influence of a spring element. The hydraulic cylinder communicates via a closable line with a collecting tank. As a result, the resilient support and the locking of the movable further support elements is attained at relatively little engineering expense.

According to another exemplary embodiment of the present invention, the further support elements are movable toward the bearing side of the workpiece and can be clamped firmly in these working positions once they are in contact with the bearing side. In contrast to the first preferred embodiment discussed above, the further support elements in this case are brought into contact with the bearing side of the workpiece only when the workpiece is resting on the fixed support pins and is pressed against them.

A simple structural realization of this exemplary embodiment is attained by providing threaded spindles that are moved by rotatable nuts.

Further details and embodiments of the invention will become apparent from the ensuing description of an exemplary embodiment, taken in conjunction with the drawings.

BRIEF DESCRIPTION OF THE DRAWINGS

FIG. 1 is a section taken through an apparatus for fine machining of plane surfaces of disk-shaped workpieces along the line I—I of FIG. 3, but with the workpiece already in position;

FIG. 2 is a section taken along the line II—II of FIG. 3, again with the workpiece already in position; and FIG. 3 is a plan view of the apparatus of FIGS. 1 and 2, but without the workpiece.

DESCRIPTION OF THE PREFERRED EMBODIMENT

The apparatus shown in the drawings for fine machining plane surfaces of disk-shaped workpieces, according to a preferred exemplary embodiment of the present invention, is used to provide a defined support, on the one hand, to prevent tilting of the workpiece while it is being machined, where the workpieces have an unmachined bearing side and a relatively slight wall thickness; on the other hand, the apparatus nevertheless serves to support relatively thin workpieces over a relatively large area, to prevent bending of the workpiece as a consequence of the machining pressure.

The apparatus according to the present invention has a chuck 11, which in a manner not shown is secured on a machine table and supported while being driven in rotation. The chuck 11 serves to receive, and approximately center, and carry along with its own rotation a disk-shaped workpiece 12 that is to be machined and that has an unmachined bearing face 13 and a slight wall thickness. The approximate centering and the rotationally fixed carrying along of the workpiece 12 by the rotating chuck 11 is accomplished, in the exemplary embodiment shown, by struts 16 distributed about the circumference and ending below the surface of a main body 14 of the chuck 11. The struts 16 engage centering or carrier prongs 17 on the workpiece 12. It will be understood that the approximate centering and the rotationally fixed carrying of the workpiece can also be adapted to the workpiece 12 in any other desired manner. A cup wheel 19, which is held and rotationally driven on a spindle 21, is provided parallel to the workpiece surface 18 that is to be machined. The spindle is joined to a drive mechanism in some suitable manner, not shown.

Near its outer circumference, the main body 14 of the holder chuck 11 is provided with three support pins 22 distributed uniformly about the circumference; in this instance the pins are disposed adjacent to the carrier struts 16 and with one end are screwed into threaded blind bores 23 provided in the main body 14, where they are retained. The three support pins 22 provide a three-point support for the workpiece 12, the bearing side 13 of which is unmachined and is provided with irregularities shown in exaggerated form in FIG. 1. Normally, the bearing side 13 of the workpiece 12 is sufficiently flat as to assure that whenever the bearing ends 24 of the support pins 22 are located in a plane parallel to the cup wheel 19, the surface 18 that is to be fine machined will also be disposed correspondingly parallel. In workpieces having more highly irregular unmachined bearing sides 13, it is also possible for the support pins 22 to be embodied such that they are adjustable in height; in that case, they can be locked or blocked where they are once their height has been adjusted accordingly.

Between the fixed, or adjustably fixable, support pins 22, further (additional) support elements are provided, in the form of pins or tangs 26. In the illustrated exemplary embodiment two further support tangs 26 are provided between each two adjacent support pins 22. These support tangs 26 are arranged in a circular ring, corresponding to the circular annular form of the workpiece 12, along with the support pins 22. It will be understood that in the case of disk-shaped workpieces 12 not having a central opening, it is also possible to provide additional support tangs 26 between the support pins 22 and the center axis of the workpiece.

With a shaft 28 provided with the support end 27, each support tang 26 passes through a bore 29 that is machined into the main body 14 from the top 15 and opens into a cylindrical chamber 31 of larger diameter. In this cylinder 31, the shaft 28 is slidingly supported with its integrally formed-on piston 32, which has a piston ring seal 33. All the cylinders 31 are sealingly covered by a plate 34 disposed on the underside of the main body 14. Inside the cylinder 31, a compression spring 36 is also provided, supported at one end on the underside of the piston 32 and at the other on the opposite side of the plat 34.

The chamber 37 between the piston 32 and the plate 34 in each cylinder 31 communicates via conduit bores 38 and 39 in the plate 34 and via a collecting bore 41, which communicates with the chambers 37 of all the cylinders 31 of the support tangs 25, with a collecting chamber 42 provided in the main body 14. This collecting chamber 42 is filled with hydraulic fluid, which is also provided inside the chambers 37 of the cylinder 31 and inside the bores 38, 39, 41.

Protruding into the collecting chamber 42 is the tappet 47 of a valve 46, which has a sealing cone 48 on its lower end. The sealing cone 48 is capable of cooperating with a corresponding sealing face 49 of the collecting bore 41. The tappet 47 is movable back and forth in the direction of the collecting bore 41. For this purpose, the tappet 47 is articulatedly joined, at its end 52 that passes through a bore 51 of the main body 14 and protrudes beyond the top 15 of this body 14, to a double-armed lever 53, which is supported at a fixed pivot point 54 on the main body 14 and is provided on its free lever end 56 with an actuating button 57. Opposite the actuating button 57, the free end 56 of the double-armed lever 53 is loaded by a compression spring 58, which is supported at its other end on the bottom of a recess 59 in the main body 14.

The free end 56 of the double-armed lever 53 is lockable with the aid of a latch 62, which is also double-armed and is pivotably supported by a pivot point 63 secured to one side of the circumference of the main body 14. One end of the latch 62, remote from the double-armed lever 53, is loaded by a compression spring 64, which is supported on the bottom of a recess 66 in the main body 14. This arm of the latch 62 is also connected to a button 67. The other arm of the latch 62 is provided on its free end with a locking protrusion 68, which in the position of repose of the latch 62 that is shown overlaps the free end 56 of the double-armed lever 53 and keeps it in a position in which the valve 46 is opened, or in other words in which the tappet 47 unplugs the collecting bore 41.

The function of the holder chuck 11 for the workpiece 12 is as follows:

Before a workpiece 12 is placed upon the fixed support pins 22, the further support tangs 26, under the influence of the compression springs 36, are pushed upward (as seen in the drawing) in such a manner that their support ends 27 protrude beyond the support ends 24 of the support pins 22. If the workpiece 12 is now placed on the holder chuck 11, or on its fixed support pins 22, then the further support tangs 26 are pushed back, counter to the action of the compression springs 36, so that the support ends 27 of the support tangs 26, in their applicable working position, are in contact with the underside, i.e. the bearing side 13, of the workpiece 12, even though the workpiece is also resting with its bearing side 13 on the support pins 22. In this retracting movement of the support tangs 26, hydraulic fluid, which is located in the chambers 37 of the cylinder 31, is pressed through the bores 38, 39 and 41 into the collecting chamber 42, when the valve 46 is open as shown in FIG. 1. Once the workpiece 12 has been received and is pressed by the cup wheel 19 against the support pins 22, then the further support tangs 26 are blocked from making any further movement. This is because pressure exerted on the button 67 moves the latch 62 and releases the valve 46. By releasing the double-armed lever 53, and under the influence of the compression spring 58, the sealing cone 48 of the valve 46 comes to rest against the sealing face 49 of the collecting bore 41, blocking the outflow of hydraulic fluid from the chambers 37 through the bores 38, 39, 41. As a result, the further support tangs 26 cannot move any farther back, and so bending of the workpiece 12 under the influence of the machining pressure cannot occur during the machining operation.

Once the fine machining of the surface 18 of the workpiece 12 that is to be machined is completed, the valve 46 is once again opened, by exerting pressure on the button 57, and the open position is locked in by the engagement of the latch 62. Once the workpiece 12 is removed from the holder chuck 11, the further support tangs 26 can move back upward, under the influence of the compression spring 36, while at the same time hydraulic fluid is reaspirated from the collecting chamber 42 via the lines 38,39,41.

In another exemplary embodiment of the present invention, not shown here, the further support tangs are embodied as threaded spindles, which are supported in the main body 14 where they are movable axially up and down with the aid of rotationally driven nuts. In this exemplary embodiment, the threaded spindles, in their initial position, rest with their support ends always below the support ends of the fixed support pins, rather than above them. The further support tangs in the form of threaded spindles are not moved into contact with the bearing side 13 of the workpiece 12 until the workpiece 12 rests firmly, under the pressure of the cup wheel 19, against the support pin 12. Then the threaded spindles are moved toward the underside, or bearing side 13, of the workpiece until such time as a predetermined torque is attained. After that, the nuts that serve to drive the threaded spindles are blocked. Once again, support while the workpiece is being machined is provided, and bending of the workpiece under the machining pressure is prevented.

What is claimed is:

1. An apparatus for the fine machining of the plane surfaces of disk-shaped workpieces having an unmachined bearing side and slight wall thickness, comprising:
   a rotatable chuck including three support pins, and at least one displaceably mounted support element located between adjacent pairs of pins, each of said pins being located about a periphery of said chuck for engagement with the unmachined side of the workpieces, in which engagement position the support elements are fastened; and
   tool means for pressing the unmachined bearing side of the workpiece against said pins and support elements for machining.

2. The apparatus as defined in claim 1, wherein said support elements include a pin and means for resiliently mounting the pins in the axial direction of the pins, and wherein each support element pin is biased by its resilient mounting means into an initial position according to which the support element pin extends beyond the fixed height of its adjacent support pins.

3. The apparatus as defined in claim 2, wherein said support elements further include means for blocking the pins in their adjusted position.

4. The apparatus as defined in claim 1, wherein the three support pins are adjustable to a fixed height.

5. The apparatus as defined in claim 1, wherein the support elements are located about the periphery of said chuck.

6. The apparatus as defined in claim 1, wherein the three support pins are adjustable to a fixed height, and the support elements are located about the periphery of said chuck.

7. An apparatus for the fine machining of the plane surfaces of disk-shaped workpieces having an unmachined bearing side and a slight wall thickness, comprising:
   a rotatable chuck including: a body; a plurality of pins adjustable to a fixed height from said body; a hydraulic collecting tank formed in said body; a plurality of hydraulic cylinders formed in said body; closable means connecting the hydraulic collecting tank with each hydraulic cylinder; and a support element displaceably mounted in each hydraulic cylinder for extending in the direction of said pins under the influence of a hydraulic medium in its respective hydraulic cylinder, said pins and support elements being located about a periphery of said body; and
   tool means for pressing the unmachined bearing side of the workpiece against said pins and support elements.

8. The apparatus as defined in claim 7, further comprising:
   a spring located in each hydraulic cylinder wherein said support elements each include a support pin engageable with an associated spring.

9. The apparatus as defined in claim 7, further comprising:
   valve means associated with the hydraulic collecting tank for controlling the connection of the collecting tank to the connecting means.

10. An apparatus for the fine machining of the plane surfaces of disk-shaped workpieces having an unmachined bearing side and slight wall thickness, comprising:
    a rotatable chuck including a plurality of support pins adjustable to a fixed height, and at least one displaceably mounted support element located between adjacent pairs of pins, said pins and support elements being located about a periphery of said chuck for engagement with the unmachined side of the workpieces, wherein:
    said support elements include a pin and means for resiliently mounting the pin in the axial direction of the pin, said means for resiliently mounting a support element pin including a hydraulic cylinder and a piston displaceable within the hydraulic cylinder; and
    each support element pin is biased by its resilient mounting means into an initial position according to which the support element pin extends beyond the fixed height of its adjacent support pins.

11. The apparatus as defined in claim 10, further comprising:
    a hydraulic collecting tank; and
    closable means for connecting the hydraulic cylinder to the hydraulic collecting tank.

12. The apparatus as defined in claim 10, wherein the means for resiliently mounting a support element pin further includes a spring within said hydraulic cylinder and in engagement with said piston.

13. An apparatus for the fine machining of the plane surfaces of disk-shaped workpieces having an unmachined bearing side and slight wall thickness, comprising:
    a rotatable chuck including a plurality of support pins adjustable to a fixed height, and at least one displaceably mounted support element located between adjacent pairs of pins, said pins and support elements being located about a periphery of said chuck for engagement with the unmachined side of the workpieces, wherein:
    said support elements include a pin, means for resiliently mounting the pin in the axial direction of the pin and means for blocking the pins in their adjusted position, said means for resiliently mounting a support element pin including a hydraulic cylinder and a piston displaceable within the hydraulic cylinder; and each support element pin is biased by its resilient mounting means into an initial position according to which the support element pin extends beyond the fixed height of its adjacent support pins.

14. The apparatus as defined in claim 13, further comprising:
   a hydraulic collecting tank; and
   closable means for connecting the hydraulic cylinder to the hydraulic collecting tank.

15. The apparatus as defined in claim 13, wherein the means for resiliently mounting a support element pin further includes a spring within said hydraulic cylinder and in engagement with said piston.

* * * * *